(No Model.)

I. S. SCHUYLER.
MACHINE FOR CUTTING SCREW THREADS.

No. 256,166. Patented Apr. 11, 1882.

WITNESSES:
Chas. Nida
C. Sedgwick

INVENTOR:
I. S. Schuyler
BY Munn & Co
ATTORNEYS.

UNITED STATES PATENT OFFICE.

ISAAC S. SCHUYLER, OF NEW YORK, N. Y.

MACHINE FOR CUTTING SCREW-THREADS.

SPECIFICATION forming part of Letters Patent No. 256,166, dated April 11, 1882.

Application filed July 7, 1881. (No model.)

*To all whom it may concern:*

Be it known that I, ISAAC S. SCHUYLER, of the city, county, and State of New York, have invented certain new and useful Improvements in Machines for Cutting Screw-Threads, of which the following is a specification.

In Letters Patent granted to me August 3, 1880, for machines for cutting screw-threads on fittings, revolving arbors carrying circular cutters are shown, and the arbors are carried by a revolving head.

The present invention is an improvement on the cutting devices used on the machines named, and has for its object to insure greater perfection in the thread cut.

The invention consists in chasing-tools combined with revolving cutters, as hereinafter described and claimed.

Figure 1:
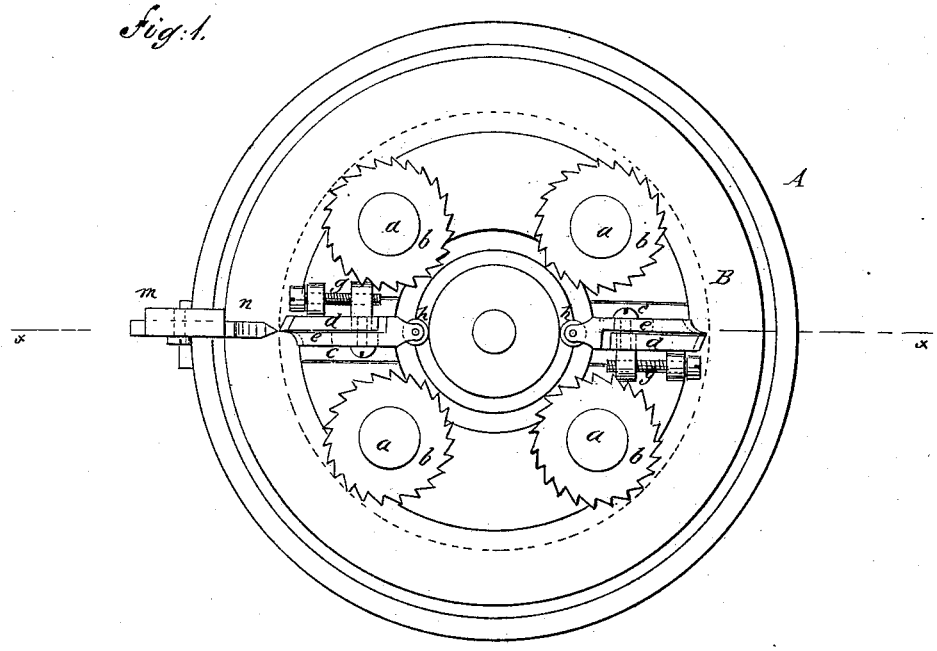
Figure 2:
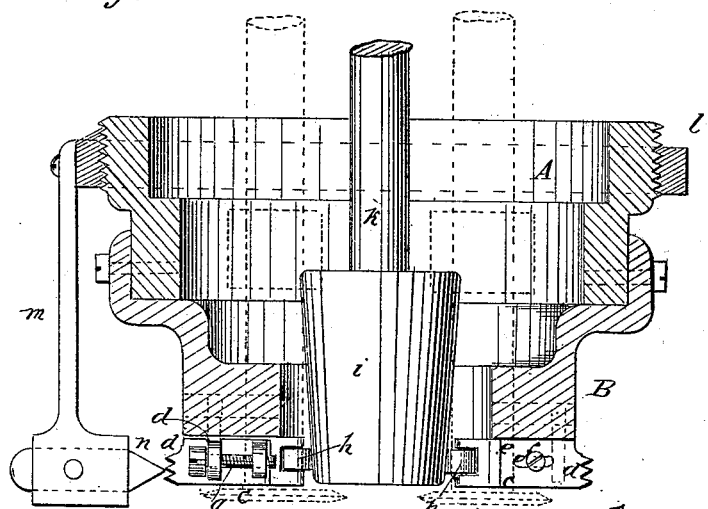
Figure 3:
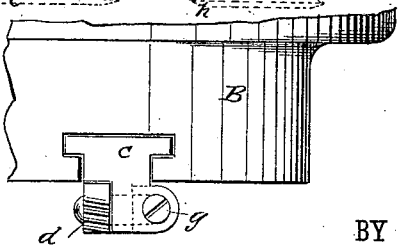

In the accompanying drawings, Figure 1 is a front elevation of the revolving head and thread-forming devices. Fig. 2 is a longitudinal section of the head on line $xx$ of Fig. 1, and Fig. 3 is a partial side view of the head.

Similar letters of reference indicate corresponding parts.

A is the cylindrical head, which is to be sustained and fitted for revolution as shown in the aforesaid Letters Patent, and carries the several arbors, $a$, of the cutters $b$. The arbors $a$ are to be sustained in head A by boxes fitted for radial movement, and the arbors revolved by suitable mechanism.

On the outer end of head A is attached a ring, B, of reduced diameter, so that it may enter the work, and through the face of this ring the arbors $a$ extend. The face of the ring is formed with dovetailed or undercut grooves, in which are slides $c$, carrying chasers $d$. The slides are formed with flange-projections $e$, to which the chasing-tools $d$ are attached by screws $f$, passing through slots in the tools, so as to allow of adjustment. Screws $g$, tapped through lugs on the tools and flanges, are for the purpose of adjusting the tools and retaining them projected against pressure in operation.

On the inner end of slides $c$ there are rollers $h$, which bear on a tapering boss, $i$, that is on a shaft-rod, $k$, extending centrally of the head A. The boss $i$ retains the slides $c$ projected to proper extent, and serves the same purpose, in connection with the cutters, as described in the aforesaid Letters Patent. The tapering surface, in connection with endwise movement of the rod, insures the taper form of screw required to be cut on fittings.

The cutting ends of the chasers $d$ are made in the form of a segment of a screw, so as the better to follow the thread cut by cutters $b$. Four of the cutters $b$ and chasers $d$ are used, and the chasing-tools are placed alternately of the circular cutters.

The head A is fitted with a screw-ring, $l$, the thread of which is cut true to the same number of threads to the inch that is required in the completed work. To ring $l$ is attached an arm, $m$, that carries a pointed finger, $n$, projecting contiguous to the cutting-points of the chasers. This arm and finger are for use as a guide in setting the chasers with their cutting-points on a true spiral, so that the chasers shall act at uniform depth and at the true inclinations. The ring $l$ being held by a screw similar in pitch to the finished work when the ring is turned, it will carry the finger $n$ over the chasers in a spiral path to correspond, and thus the chasers can be tested. During the operation of the machine the arm $m$ is turned back.

In the operation of the machine the head is revolved, and at the same time moved forward, so that the cutters $b$ move in a spiral path, and also revolve with their arbors. The cutters $b$ are in advance of the chasers $d$, and cut the thread on the work. The chasers follow the thread cut, and finish the same truly and smoothly.

Having thus fully described my invention, I claim as new and desire to secure by Letters Patent—

1. The chasers $d$, in combination with the revolving head A, ring B, and revolving circular cutters $b$, substantially as and for the purposes set forth.

2. The slides $c$, chasers $d$, and adjusting-screws $g$, in combination with the grooved ring B, revolving head A, and circular cutters $b$, substantially as and for the purposes set forth.

3. The screw-ring $l$, arm $m$, and finger $n$, combined with head A and adjustable chasers $d$, substantially as and for the purposes set forth.

ISAAC S. SCHUYLER.

Witnesses:
GEO. D. WALKER,
C. SEDGWICK.